United States Patent
Raimbault et al.

[19]

[11] Patent Number: 5,923,251
[45] Date of Patent: Jul. 13, 1999

[54] PHASE CONTROL METHOD FOR ELECTRONIC TAGS AND STATION AND TAG IMPLEMENTING SAID METHOD

[75] Inventors: Pierre Raimbault, 9 Rue Portalis, 75008 Paris; Jean Goupil, Paris, both of France

[73] Assignee: Pierre Raimbault, Paris, France

[21] Appl. No.: 08/757,471

[22] Filed: Nov. 27, 1996

[30] Foreign Application Priority Data

Dec. 1, 1995 [FR] France ................................. 95 14252

[51] Int. Cl.[6] ................................................. G08B 13/14
[52] U.S. Cl. ................... 340/572; 340/572.4; 340/572.5; 340/511
[58] Field of Search .................... 340/572, 551, 340/511, 825.54; 375/375; 343/742

[56] References Cited

U.S. PATENT DOCUMENTS

| | | | |
|---|---|---|---|
| 4,859,991 | 8/1989 | Watkins et al. | 340/572 |
| 5,103,209 | 4/1992 | Lizzi et al. | 340/511 |
| 5,121,103 | 6/1992 | Minasy et al. | 340/572.5 |
| 5,264,854 | 11/1993 | Spiess | 342/44 |
| 5,266,925 | 11/1993 | Vercellotti et al. | 340/572 |
| 5,349,332 | 9/1994 | Ferguson et al. | 340/572 |
| 5,353,011 | 10/1994 | Wheeler et al. | 340/572.4 |
| 5,450,492 | 9/1995 | Hook et al. | 340/572 |
| 5,495,229 | 2/1996 | Balch et al. | 340/572 |
| 5,512,878 | 4/1996 | Balch et al. | 340/572 |
| 5,519,381 | 5/1996 | Marsh et al. | 340/572 |
| 5,680,106 | 10/1997 | Schrott et al. | 340/825.54 |
| 5,699,046 | 12/1997 | Accolla et al. | 340/572 |

FOREIGN PATENT DOCUMENTS

| | | |
|---|---|---|
| 0 006 691 A1 | 1/1980 | European Pat. Off. . |
| 0 161 779 A1 | 11/1985 | European Pat. Off. . |
| 0 242 906 A1 | 10/1987 | European Pat. Off. . |
| 0 473 569 A2 | 8/1991 | European Pat. Off. . |
| 0 472 472 A2 | 2/1992 | European Pat. Off. . |
| 0 495 708 A1 | 7/1992 | European Pat. Off. . |
| 0 496 609 A1 | 7/1992 | European Pat. Off. . |
| WO 84/03566 | 9/1984 | Germany . |
| 2 116 808 | 9/1983 | United Kingdom . |

*Primary Examiner*—Jeffery A. Hofsass
*Assistant Examiner*—John Tweel, Jr
*Attorney, Agent, or Firm*—Fish & Richardson P.C.

[57] ABSTRACT

An electronic tag and a method for remote interrogation of electronic tags from a station are provided in which, in reply to polling signals sent from a station, tags send responses which may interfere, the method comprising a step in which the tags are brought into phase before sending their responses.

30 Claims, 6 Drawing Sheets

PHASE CONTROL METHOD FOR ELECTRONIC TAGS AND STATION AND TAG IMPLEMENTING SAID METHOD

BACKGROUND OF THE INVENTION

The present invention relates to a method of remotely polling or interrogating electronic tags (also known as radio tags) from a station. It also relates to a station for remotely polling electronic tags, notably for implementing the method.

The invention further provides an electronic tag having means for communicating with the station for receiving polling signals or interrogations from the station and for sending responses back to the station, notably for implementing the method.

Further, the invention also relates to a combination of such a station and such electronic tags.

The invention generally relates to the field of polling electronic tags remotely from a station or exit gate or the like. Numerous applications are possible, in widely-ranging fields. The following can be given as examples:

checking, checking out and/or verifying electronically-tagged articles purchased by supermarkets customers;

counting of tagged objects for stock management in a factory or industrial plant;

recognizing and orienting tagged objects such as, for example, suitcases in an airport;

recognizing the passage of objects fitted with tags, such as for example automobiles at a pay station, and exchange of information with such objects;

in systems for restricting access or for monitoring access of persons carrying an electronic tag to an installation or site, etc.

Other applications are possible.

In the remainder of this specification, the term "tag" will simply be used to designate an electronic tag, independently of its physical support or use.

The term "gate" or "station" will generally be used for the inquiry station from which tags are polled; the physical form of this station is obviously not limited to the physical structure of a frame or gate.

By the terms interrogation, polling, or probing, we mean a station calling up, interrogating or polling tags in order to, if necessary, exchange information with them.

Systems for remotely polling electronic tags already exist.

In the case of simultaneous interrogation of several tags, the problem arises from the tags replying simultaneously or in overlapping fashion, which we shall call below "collision". Generally speaking, prior art documents propose that the tags send their responses in a given format designed to be recognised by the station; in some documents, it is proposed that the response from the tags should depend on their code. The station can then check the validity of the response it has received, in order to detect collisions.

The following documents disclose examples of solutions to the problem of collision detection and avoidance: European Patent Applications EP-A-0,495,708, EP-A-0,161,779, EP-A-0,472,472 or British Patent Application GB-A-2,116,808, which disclose ways of detecting collisions and avoiding them.

EP-A-0,473,569 discloses a system of this type in which tags send a message consisting of their code, along with an error correcting code for collision detection purposes. Synchronization of responses from the various tags is also disclosed. In U.S. Pat. No. 5,264,854, tags send their responses at random instants in a time window, for limiting the probability of collision.

These solutions suffer from disadvantages: the presence of an error-correcting code, even of a very summary nature, requires fairly long messages. This has the effect of increasing total tag polling time. Furthermore, recourse to using responses at random points in time also lengthens the duration of polling.

The use of tags that do not have their own power supply, and which employ power transmitted by the station as their source of power has also been disclosed; in such a case where the tags are remotely powered, various systems have been proposed for the sending of responses by the tags.

It is possible for the tag to send its response at a radio frequency which is distinctly higher than the remote polling frequency. In this case, it is easy to separate, using filtering, the remote polling frequency from the frequency transmitted in return in the station's receiving coil. However, in order to get a stable and accurate sending frequency, a quartz oscillator is needed or a frequency multiplier or an oscillator with a controlled frequency, using the remote polling frequency as a reference for said control. Such methods are expensive in component costs or in semi-conductor chip power consumption.

The tag can also respond at the same frequency as the remote polling frequency; this is the case, for example, in GB-A-2,116,808. In this case, in order to detect the signal sent by tags, the station's inductor needs to be shut off. This means there is no longer any reference frequency available, or otherwise, one is confronted with the problem of the expense and bulk of providing a quartz oscillator in each tag. Simply using the coil's own resonant frequency or an RC oscillator would lead to considerable frequency inaccuracy, necessitating the use of a "panoramic" receiver cable of detecting responses in several tens of partially-overlapping channels covering all possible ranges of frequency drift. Such a receiver would be complex and expensive.

It has also been proposed to short-circuit the tag's coil as a way of sending back responses from tags, thereby generating a slight variation in current in the inductor. This method which is for example disclosed in EP-A-0,2,42,906 is simple and does not require a complicated circuit in the tag. However, variation in current is undetectable when the inductor covers a large area, in other words when the useful volume exceeds some hundred liters.

WO-A-84/03566 proposes sending the response from the tag at a frequency n.f.$_s$, where f$_s$ is the station's sending frequency. Values of n of 1,2 or 3 are proposed or, further in another embodiment, ½, ⅓, ¼, etc. The device proposed in the tag comprises separate sending and receiving coils.

EP-A-0,006,691 discloses a tag using a single send-receive coil in which sub-harmonics of the station sending frequency are obtained by means of a switching device situated between the coil and a tuning capacitor. Another problem is that of the position of a tag within the electromagnetic polling field broadcast by the station. Indeed in some applications, tags can present themselves in the polling field with a random spatial orientation. If a receive coil of a tag is located in a plane parallel to the station's inductive field, no flux will pass through the coil and, in the absence of an induced voltage, the tag cannot reply.

To resolve this problem, in EP-A-0,496,609, it is proposed to employ two sending antennae in the form of frame antennae, situated in perpendicular planes, and supplied with signals in phase quadrature, in order to establish a rotating polling field.

This solution is not satisfactory: the induced field remains in this case in a plane orthogonal to the two frames leaving open the possibility of tags situated in this plane not being detected.

It has also been proposed in EP-A-0,496,609, to employ a third sending antenna in the form of a frame, located in a plane orthogonal to the two other antennae planes and to feed the three antennae with signals in quadrature.

This solution could be satisfactory in the case of one single tag. The effect would be moreover the same if one were to employ three antennae in three different planes, exciting them successively pairwise with signals in quadrature. More generally, the use of two or three antennae with signals in quadrature is not satisfactory.

SUMMARY OF THE INVENTION

The invention proposes a solution to the problems arising from any possible distribution of several tags within an area covered by a station.

It proposes a solution to the new problem of how to detect responses which may interfere, coming from a plurality of tags distributed over the station's polling area.

More precisely, it is possible for several tags to simultaneously reply to an interrogation or for them to send reply signals together over a given period. This is normal and has no effect on the operation of the system if the responses sent from the tags are identical and add together or if the responses sent by the tags are in phase opposition and undergo subtraction; however, if care is not taken, it can happen that tags having symmetrical positions within the inductive field deliver identical responses in phase opposition, or separate responses having relative phases, whereby the resulting signal picked up in the receive loop is not detectable.

This problem has not been described in documents of the prior art: there, only responses from tags were disclosed that included an error detecting code that was sufficiently long for this problem not to be identified. This is notably the case with the system in EP-A-0,473,569: the use of an error-correcting and tag response synchronizing code is disclosed, but the problem of the phase of responses from tags is not mentioned.

When several tags send, at least partially together, a brief response as is the case in applicant's co-pending patent application entitled "Remote tag polling method, and station and tag applying said method", this new problem is significantly highlighted. Cancelling of responses from various tags can be partial or total, and simultaneous responses originating from two tags lying end-to-end in the inductive field of the station may completely cancel each other out. The invention proposes a solution to this new problem and also allows faster polling of a large number of tags.

Finally, the invention proposes a solution to the problem of the spatial orientation of tags. It thus makes it possible to remotely and simultaneously poll tags, independently of their position in the polling field. The solution provided by the invention is particularly suitable for the case of tags which respond with a brief signal.

It will be understood that the use of a rotating field, as suggested in EP-A-0,496,609, considering that this involves different phases throughout the whole useful volume, further multiplies the probability of the new problem discussed in this invention occurring, and, from this aspect, is not satisfactory.

The invention provides a method for remote polling of electronic tags from a station in which, in reply to polling signals sent by said station, tags send responses which may interfere, and comprising a step in which the tags are brought into phase before sending their responses.

In one preferred embodiment the tags simultaneously send a common response.

In one preferred embodiment the step in which the tags are brought into phase comprises the sending, by said station, of a phasing command.

In another preferred embodiment said phasing command comprises breaking off sending followed by the sending of an alternating signal.

In one preferred embodiment the step in which the tags are brought into phase is carried out, at a tag, by counting half waves of a phasing command and determining the polarity of a half wave of a predetermined rank.

In another preferred embodiment the step in which the tags are brought into phase is carried out, at a tag, by counting half waves of a phasing command and sending a response to a station having the polarity of a determined half wave in said phasing command.

In a preferred embodiment the response from tags is sent at a frequency which is a sub-multiple of a station send frequency.

In one preferred embodiment polling signals are sent by said stations successively in different directions.

In another preferred embodiment polling signals are sent by said stations successively in orthogonal directions.

In yet another preferred embodiment polling signals are successively sent by said stations in three orthogonal directions.

The invention also provides a station for remotely polling electronic tags comprising means for sending polling signals to electronic tags, means for receiving responses from tags, and control means, in which said polling signals include a command for bringing said tags into phase.

In one preferred embodiment of the station, the command for bringing said tags into phase comprises a break in sending followed by the sending of an alternating signal.

In one preferred embodiment the means for sending polling signals include means for rapidly bringing an alternating signal to a steady state.

In another preferred embodiment the means for sending polling signals comprise:

a resonant circuit with an inductor and a tuning capacitor;

means for exciting said resonant circuit with an excitation alternating voltage;

and In one preferred embodiment the means for rapidly bringing an alternating signal to a steady state comprise:

means for blocking said excitation alternating voltage at one half wave, and means for maintaining a permanent current in said inductor.

In one preferred embodiment of the station, the means for maintaining a permanent current in said inductor comprise a resistor one end of which is connected to a point in said resonant circuit between said inductor and said tuning capacitor, and the other end of which can be connected to ground.

In a preferred embodiment the means for sending polling signals are capable of successively sending polling signals in different directions, preferably orthogonal and preferably in three different directions.

In one preferred embodiment the means for receiving responses from said tags comprise a read coil and means for balancing out a voltage induced in said read coil by said sending means, and preferably comprising a transformer.

The invention additionally provides an electronic tag having means for communicating with a station for receiving polling signals from the station and sending responses to said station comprising means for counting half waves of a phasing command, and means for determining a polarity of a determined half wave in said polling signal.

Additionally, the invention provides an electronic tag having means for communicating with a station for receiving polling signals from the station and sending responses to said station comprising means for counting half waves of a phasing command, and in one preferred embodiment said means for communicating with a station send a response having a polarity equal to that of a determined half wave of said phasing command.

In one preferred embodiment of the tag, the means for communicating with a station comprise coil means and in said counting means comprise two threshold amplifiers and a counter receiving output signals of said two threshold amplifiers as its input signal.

In a further preferred embodiment said means for communicating with a station comprise coil means and in which sending of responses is achieved by modifying a current in said coil means, preferably by short-circuiting said coil means.

A combination of such a station and an electronic tag is also provided.

Other advantages and characteristics of the invention will become more clear from the description that follows of various embodiments provided by way of example and with reference to the attached drawings.

DETAILED DESCRIPTION OF PREFERRED EMBODIMENTS

Generally speaking, the functionalities of the tags suitable for remote polling are as follows: ability to remotely communicate with the station in both send and receive mode; preservation of optionally reprogrammable code, and the ability to draw up tag responses as a function of questions received from the station.

Station functionalities are as follows: ability to remotely communicate with the tags, in receive mode using a pick-up loop and send mode using an inductive field; the ability to prepare questions for the tags as a function of responses received therefrom, and result processing as a function of the application. In other words, the station comprises means for sending polling messages to the tags, means for receiving responses from the tags, and control means.

Below, we use the terms "polling" or "command" for exchanges of information from the station to the tags, and the word "response" for exchanges from the tags to the station.

For this invention, it is advantageous to use the tags disclosed in applicant's co-pending application entitled "Power supply and modulation circuit for a remotely-pollable electronic tag", which is incorporated herein by reference. In relation with this invention, use can also be advantageously made of the polling method, station and the tags disclosed in applicant's co-pending patent application entitled "Remote tag polling method and station and tag applying said method", which is incorporated herein by reference.

The invention proposes an answer to the new problem discussed above.

According to the invention, when electronic tags are being remotely polled by the station, the tags issue responses to polling on the part of the station which may interfere, and consequently a step is provided in which the tags are put into phase before the tags send their responses.

Thus, by way of example, the case of two tags both present in the three-dimensional area covered by the station, arranged end-to-end and fixed on neighboring objects can be considered. At a given instant, in a known system, if the two tags respond with the same signal, and these signals are in phase opposition, the station is unable to detect any signal.

By means of this invention, it is ensured that the station will detect the signal.

It is thus ensured, regardless of the length of the response, that the station will detect sending of responses that occurred together. This ensures the station will not determine a tag is not present in the volume or area it covers.

As disclosed in applicant's co-pending application mentioned above, the tags may simultaneously send a common response. In this case, there is a greatly increased probability of destructive interference between the tags occurring.

The invention thus makes it possible to avoid such destructive interference. It provides, for just such a case, an original solution to collision management: rather than attempting to detect and avoid collision, the invention makes it possible to provoke, and control, collisions. This makes it possible to reduce total polling time. The response from tags can also vary over time as the polling procedure advances; tag responses may also only be partially common, and for example one can imagine that the only common part of responses is a beginning of a response, the remainder of the response depending on each particular tag; provisions can also be made for some of the tags to send a response for a longer period of time than others.

In all such circumstances, the step consisting in putting the tags into phase decreases the possibilities of errors of interpretation by the station.

In one embodiment of the invention, the step of putting the tags into phase comprises the sending by the station, of a phasing command. This phasing command enables the tags present in the area covered by the station to be brought into tune, by supplying a time reference. This command can be of any desired type provided there is no danger of it being confused with another command or polling signal by the tag, and provided it does effectively supply a time reference able to be recognised by the tags.

The phasing command can for example comprise a break in sending, followed by the sending of an alternating signal. The tags recognise the absence of the signal over an interval that they can evaluate even relatively inaccurately, using an internal clock. After recognising absence of the signal, the tags recognise the beginning of the presence of the alternating signal, which can act as a time reference for bringing them into phase.

To bring them into phase, the tags can count the number of half waves of the phasing signal and determine the polarity of a half wave of predetermined rank.

Thus, phasing can be achieved by briefly interrupting the inductive field (during 100 μs for example) and then continuing with the alternating signal. The first half wave induced in a tag coil following such silence can be amplified and detected, the tag being able to determine the polarity thereof. The tag can thus determine a phase reference for the logic circuit which will then, if the tag is required to respond, provide modulation for the coil.

In order to preserve this reference, it hence suffices to count the successive half waves of the induced voltage. Sending to all tags will commence at the same given half wave, the number of which (P) is chosen in an arbitrary fashion.

At the station end, means for polling the tags, means for receiving responses from the tags, and control means are provided; the polling signals comprise a phasing command enabling the tags to be brought into phase. This phasing command preferably comprises a break in sending followed by the sending of an alternating signal, as explained above.

Detecting the first half wave is sometimes difficult as the inductive field of the station as well as the tag coil are tuned circuits and they can only reach a steady state progressively. The higher their Q, the longer they take. This means that the amplitude of the first half wave can be relatively small and there is a danger of not detecting it in the tags.

The means for sending polling signals from the station consequently advantageously comprise means for rapidly bringing an alternating signal to a steady state, making it possible to strongly augment the first half wave of the alternating signal.

Figure 1:
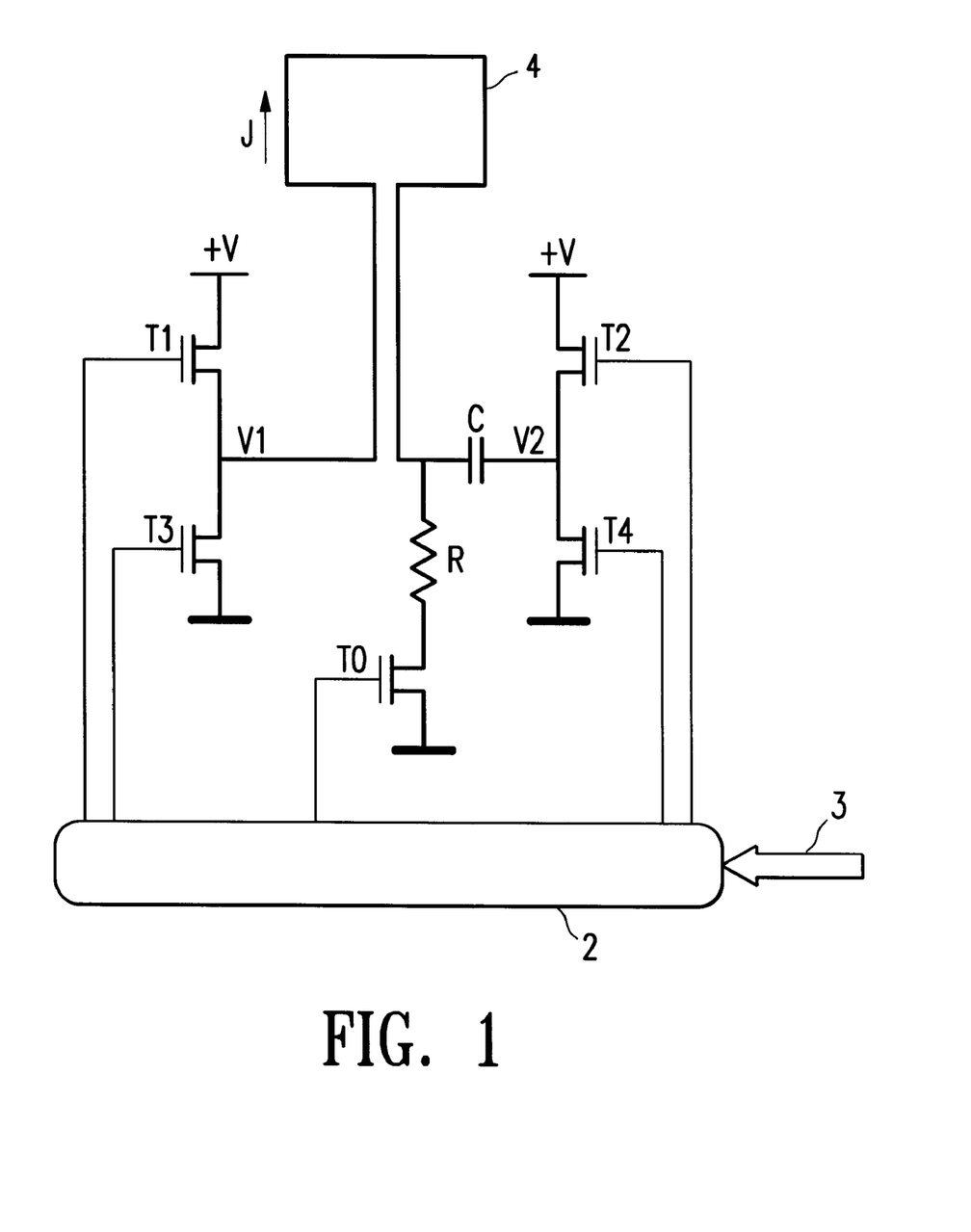
FIG. 1 is a circuit diagram of a station inductor circuit in one embodiment of the invention.

FIG. 1 is a circuit of the inductive system in a station in one embodiment of the invention.

On FIG. 1 there can be seen a resonant circuit consisting of inductor 1 and its tuning capacitor C.

This resonant circuit is excited by an alternating excitation voltage. The voltage is for example supplied by an "H" bridge composed of 4 transistors T1, T2, T3 and T4. More precisely, transistors T1 and T3 are arranged in series between a voltage source +V and ground. Similarly, transistors T2 and T4 are arranged in series between a voltage source +V and ground. One end of the resonant circuit comprising inductor and capacitor C is connected to a bridge between transistors T1 and T3 and the other end to a bridge between transistors T2 and T4. The transistors are arranged to operate as switches causing the current to alternately follow either path {+V, T1, inductor, C, T4, ground} or path {+V, T2, C, inductor, T3, ground}.

The device of FIG. 1 comprises a control circuit 2, receiving instructions from the station control means, symbolically indicated by arrow 3. The control device is connected to the base or gate of transistors T1 to T4 to turn them on or off.

The device in FIG. 1 further comprises a limiting resistor R and a transistor T0, in a series connection between ground and a point in the resonant circuit between inductor 1 and capacitor C. Transistor T0 operates as a switch, between ground and resistor R. It is also controlled by control circuit 2.

The operation of the device in FIG. 1 is described with reference to FIG. 2 which is a timing diagram for various parameters in the inductive circuit of FIG. 1.

Figure 2:
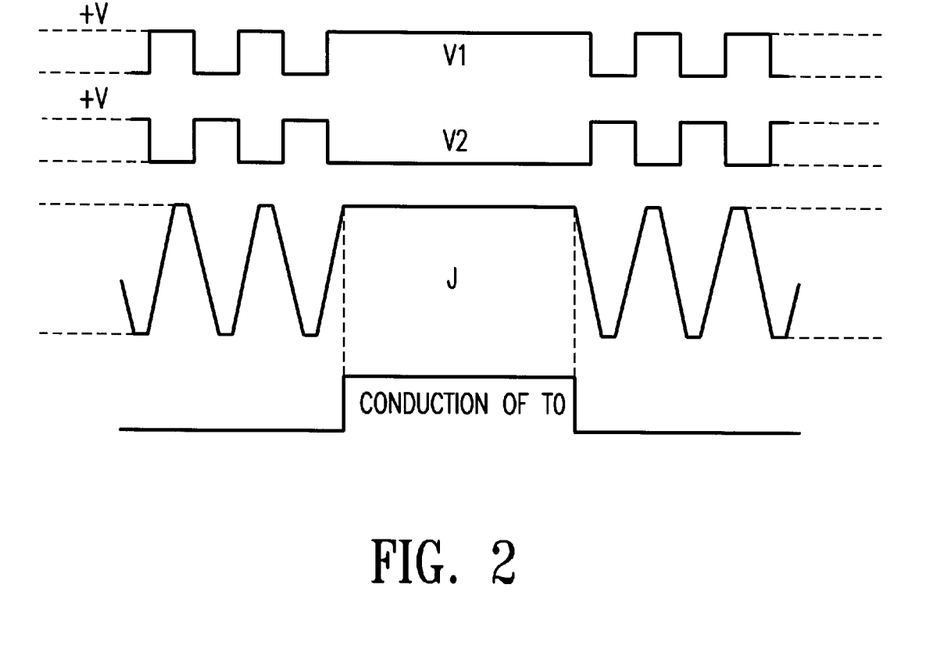
FIG. 2 is a timing diagram showing various parameters of the inductor in FIG. 1.

FIG. 2 shows, starting from the top and moving downwards, voltages V1 and V2 which are respectively those at the point of connection of the inductive circuit to the common point of transistors T1 and T3, and respectively, transistors T2 and T4; the current J in the inductor, in the direction of arrow J on FIG. 1, and, finally, the control current for transistor T0. When this control current is high, transistor T0 is switched on.

Under steady operating conditions, as shown at the left on FIG. 2, the resonant circuit consisting of the inductor and its tuning capacitor C is supplied by the H bridge consisting of the 4 transistors T1, T2, T3 and T4. These transistors operate as switches and are driven at the resonant frequency of the inductor by the control circuit. T1 and T4 are switched on during one half wave, T2 and T3 being off, after which T2 and T3 are on during the next half wave, T1 and T4 being turned off in their turn. A supply voltage (source V) of 10 to 20 Volts is sufficient to obtain a voltage of around 1000 Volts at the terminals of the inductor, and consequently sufficient current to supply the tags.

For creating a "silence" followed by immediate restarting of the inductor, T1 and T4 are kept on (T2 and T3 being off) and transistor T0 is switched on at the precise moment the current in the inductor is passing through its peak value. Adjustment of resistor R enables the current passing through T0 to be set at this peak value. This situation is shown in FIG. 2 towards the middle.

This situation can be maintained for as long as necessary after which T0 is turned off and the H bridge is started again with the suitable phase. The oscillating circuit is thus instantaneously at its steady operating amplitude, and the first half wave is easily detectable at the output from tag coils. Following this, the tags can then count the half waves, following issue of this phasing command, in order to reply.

Figure 3:
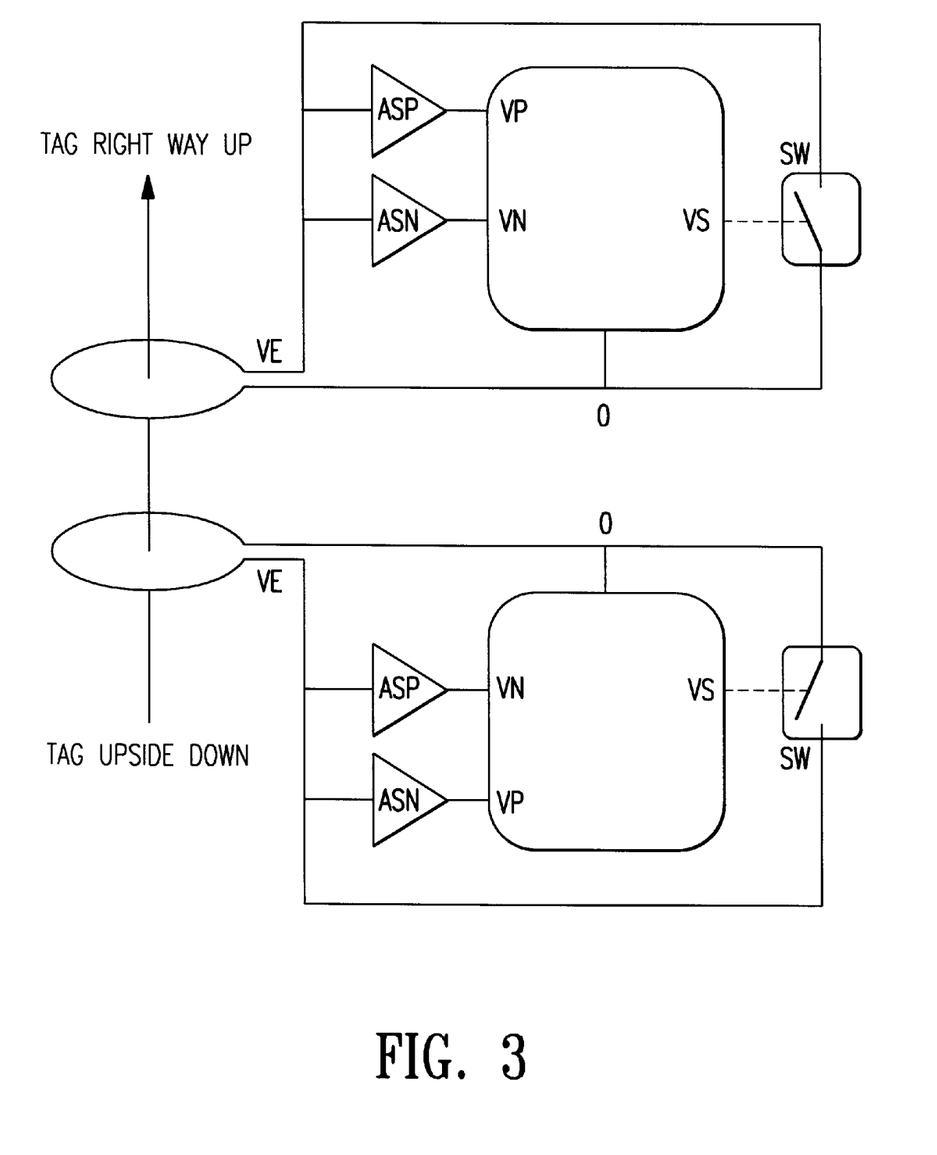
FIG. 3 is a block diagram of two tags according to the invention.

We shall now describe the reception of such a phasing command by the tags. FIG. 3 shows two tags according to the invention. To make the explanation more clear, two tags are shown end-to-end, meaning that their coils are in a parallel plane but with opposite orientations, in other words, the flux indicated by the arrow in FIG. 3 passes through the two coils in opposite directions. Now, suppose these two tags respond simultaneously to polling from the station, giving the same response and without the phasing provided by the invention, then the signals will be issued in phase opposition and the result would be that the signal picked up by the receiving loop will not be detectable.

This is the new problem the invention sets out to resolve.

Figure 4:
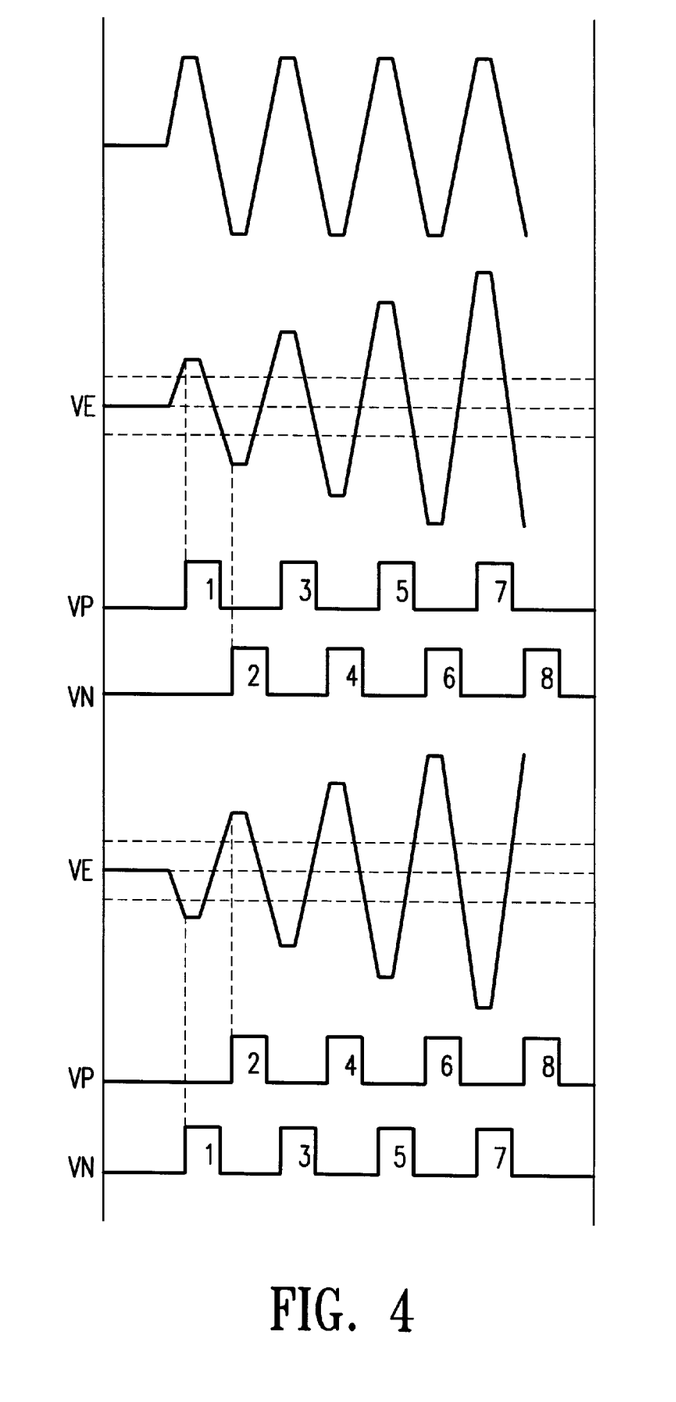
FIG. 4 is a timing diagram showing various voltages in the tags of FIG. 3.

In the case of FIG. 3, depending on the orientation of the coil plane, the phasing signal will be seen by one tag as a positive impulse and by the other as negative pulse, as shown by the voltages VE on FIG. 4.

Means are provided in the tag for counting the half waves of a phasing command. These means for example comprise two threshold amplifiers supplied with the voltages VE furnished by the coil. The first threshold amplifier ASP has a positive threshold and supplies a logic voltage VP at its output which goes high each time voltage VE exceeds a positive threshold. This threshold advantageously corresponds to the minimum value of the voltage induced in the coil of the tag situated within the 3-dimensional space covered by the station; as an example +0.5 Volt can be considered. The second threshold amplifier ASN performs the same operation with a logic voltage VN which goes high each time voltage VE falls below a negative threshold (−0.5 Volt for example). Positive transitions of VP as well as those of VN increment a counter supplying the current number of half waves at its output.

This counter is previously reset to zero by a conventional timing circuit (not shown) which is triggered when the absence of carrier voltage is detected, in other words when no transition of VP or VN appears after a period exceeding, for example, ten periods. This time can be evaluated by means of a clock internal to the chip, the accuracy of which (20 to 30%) is not critical. This time corresponds, with a certain margin, to the time during which sending is interrupted in the phasing command. In this way sending of responses from tags is synchronised. For additionally ensuring phasing, various solutions are possible; one solution consists in sending a response the polarity of which is equal to that of the half wave received; another solution consists in sending a response having the polarity of a determined half wave other than the first half wave.

Thus, in the case of FIG. 3, it will be seen that if one tag receives a first positive half wave, the other will receive a first negative half wave; if the two tags are to simultaneously send an identical response, the two responses need to have opposite polarities in order to avoid a destructive interference.

In one embodiment, the communication means comprise a coil and responses are sent by short circuiting this coil. This makes it possible to send a response the polarity of which is of necessity that of the half wave currently being sent, thus ensuring absence of destructive interference.

The response from the tags can thus be provided by short circuiting the coil by means of a device similar to a switch, switch SW in FIG. 3 controlled by the logic circuits of the tags by means of a voltage VS, for example the counter output voltage. As switch SW is not polarized, it will act in the same way on any given half wave, regardless of whether the latter is positive or negative. A voltage variation induced in the station read loop will have the same polarity in both cases: positive current in a tag coil that is the right way up will give the same effect as a negative current in a coil that is upside down. Using simple means, it is thus ensured that the tags are brought into phase.

FIG. 4 is a timing diagram showing the various voltages in the tags of FIG. 3. This shows from top to bottom:
 the voltage across the terminals of the inductor in the station;
 the voltage VE across the inductor of the first tag in FIG. 3
 the voltage VP at the output from amplifier ASP of the first tag in FIG. 3;
 the voltage VN at the output from amplifier ASN of the first tag in FIG. 3;
 the voltage VE across the inductor of the second tag in FIG. 3;
 the voltage VP at the output from amplifier ASP of the second tag in FIG. 3;
 the voltage VN at the output from amplifier ASN of the second tag in FIG. 3.

It will be noted that the voltages VN and VP are marked with numbers indicating the corresponding half wave. It can be seen in FIG. 4 that the voltages across the coil means of the two tags are of opposite polarity; consequently the first half wave is counted on voltage VP by the first tag, and on voltage VN by the second tag. However, at any given instant, the counters of both tags give identical results.

In other embodiments, phasing can be done by determining the polarity of a half wave and then controlling the sending means to send a response having the thus-determined polarity. This can for example be advantageous in the case where tags have separate send and receive coils.

We shall now describe more precisely the sending and reception of the response from the tags.

In order to be able to use the remote polling frequency Fta as a reference and to suitably detect the response from the tag, despite the high amplitude of the voltage induced in the station's read loop by the station's inductor, a sub-multiple of Fta is used as a response frequency obtained by means of a simple frequency divider. The most obvious frequency to use is Fta/2, but other sub-multiples, Fta/k, where k is an integer, could be used.

In this case, and as explained above with reference to FIG. 3, sending of a response can be done by short-circuiting the coil in the tag during even-numbered periods, leaving switch SW open during odd-numbered periods. By bringing the tags into phase as indicated above, possible cancelling out when several tags respond simultaneously is avoided.

Obviously, in a similar fashion, for a frequency Fta/k, switch SW is closed for k periods, and then opened for the k following periods.

More details of the possible structure of the tag can be found in applicant's co-pending application entitled "Power and modulation circuit for a remotely-powered electronic tag" which is incorporated by reference in this present application.

Figure 5:
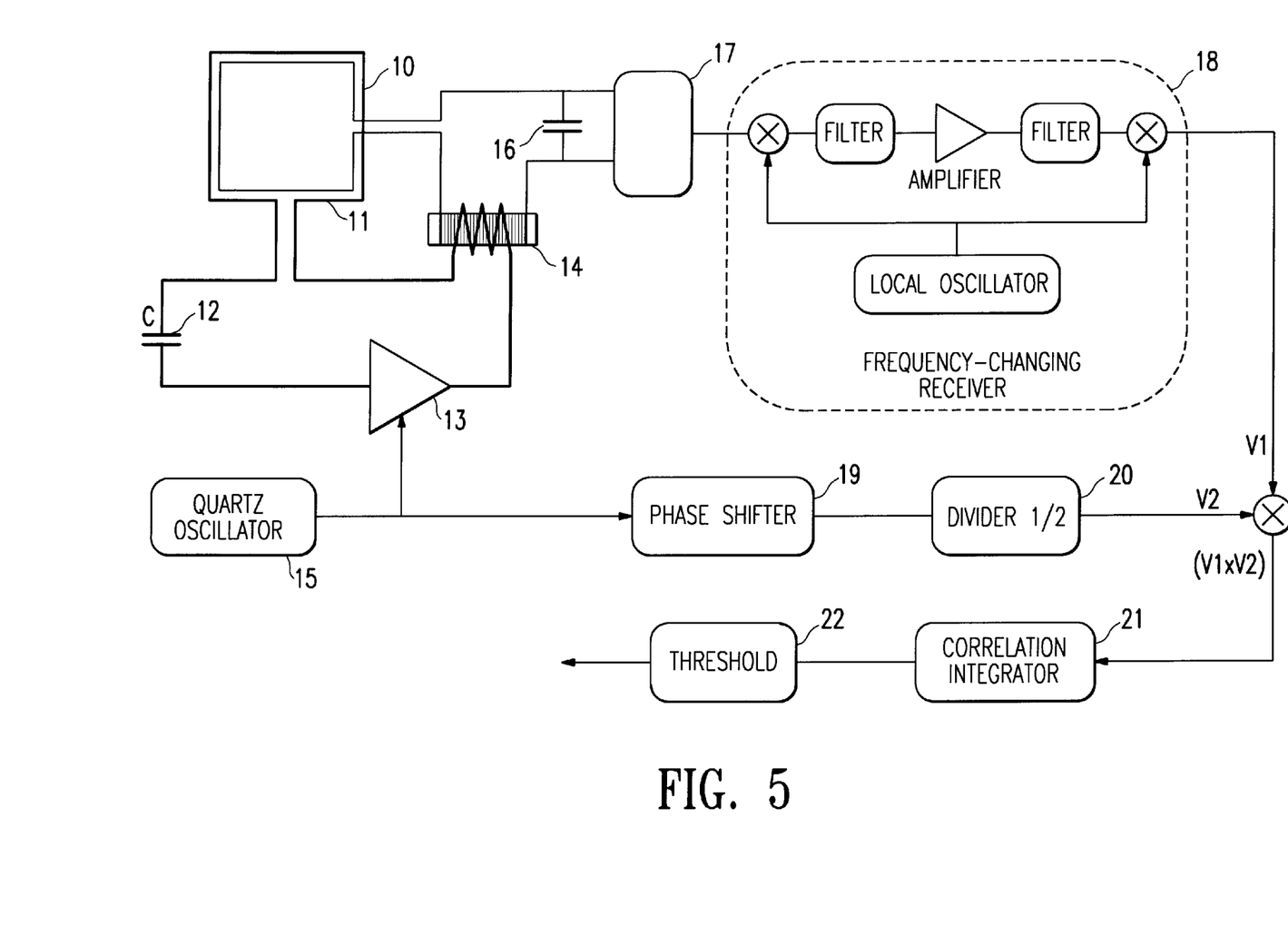
FIG. 5 is a block diagram of a station in one embodiment of the invention.

FIG. 5 is a block diagram of a station according to one embodiment of the invention; the station in FIG. 5 employs a tag sending frequency of Fta/2; the modifications necessary change to a frequency Fta/k will be obvious to the man skilled in the art.

The station in FIG. 5 has a read loop 10, parallel to inductor 11 which issues polling signals. Inductor 11 is mounted in series in a circuit comprising a tuning capacitor 12, a power amplifier 13, and the primary of a balancing transformer 14. Power amplifier 13 is clocked by a quartz oscillator 15, and controlled by station control means which are not shown.

Read loop 10 is in series in a circuit comprising a tuning capacitor 16 and the secondary of balancing transformer 14.

In this configuration, the signal induced by the tags in read loop 10 typically has a value of around 100 $\mu$V whereas the signal induced in read loop 10 by inductor 11 can reach several hundreds of volts. Balancing transformer 14 makes it possible to balance out the voltage induced in the read loop by the inductor; the residual voltage can thus be brought down to around 1 Volt.

A filter 17 is connected across capacitor 16 of the read circuit, supplying a filtered output signal in which components of the remote polling frequency Fta have been eliminated. This output signal can be amplified using, for example, a frequency changing receiver 18. The output voltage V1 from this frequency changing receiver supplies a signal at frequency Fta/2 over a range of usable frequencies. Voltage V1 is then used for detecting the useful signal. As frequency Fta/2 is strictly known, and available locally, and as the phase of the useful signal is stable, conventional synchronous or correlation detection methods can be employed, the efficiency of which increases in proportion to the duration of the response.

The voltage V1 leaving the receiver is multiplied by a reference voltage V2 originating from oscillator 15 which clocks the inductor via a variable phase-shifter 19 and a frequency divider 20. The resulting signal V1×V2 is supplied to an intercorrelation integrator 21 and following this to a threshold detector 22. Phase shifter 19 is controlled to obtain a maximum output voltage from the integrator.

This embodiment provides simple and effective detection of responses from tags.

Figure 6:
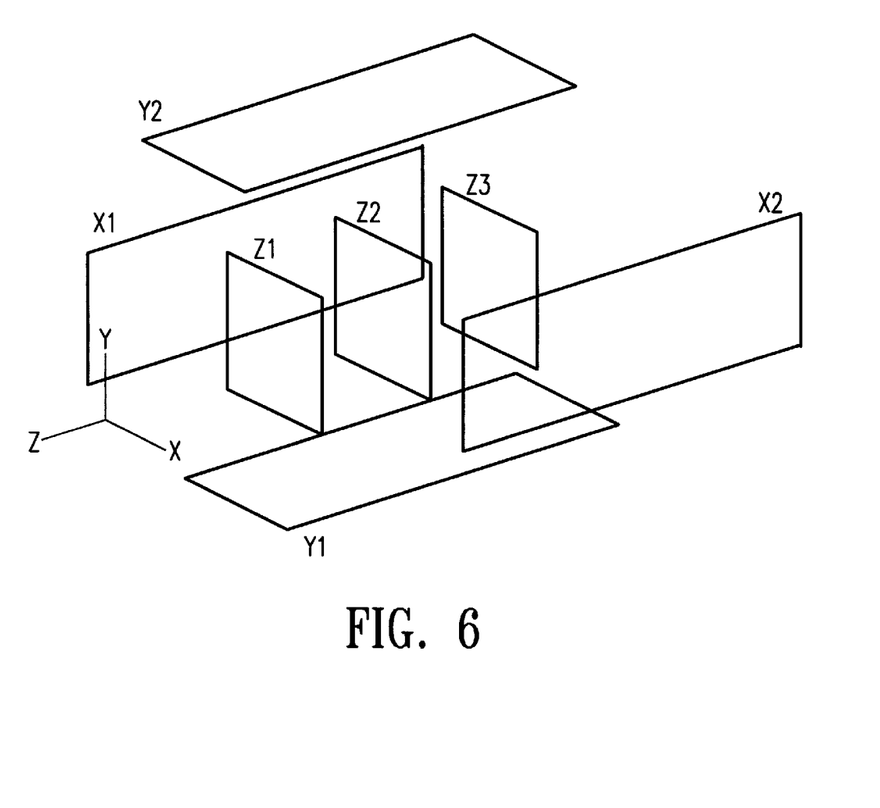
FIG. 6 diagrammatically represents a station in another embodiment of the invention.

FIG. 6 shows, in diagrammatical form, a station in another embodiment of the invention. As explained above, in some applications, the tags are oriented randomly; this is for example the case of articles that are in bulk. If a single inductor is used for remote polling, there will be, at every point in the area covered, an orientation at which a tag's coil is parallel to the inductive field. Here, no flux will pass through the coil, no voltage will be induced, and the tag does not operate and cannot consequently be polled.

The solution proposed in EP-A-0,496,609 discussed above where two perpendicular coils are used is not suitable as the phase of the induced voltage varies as a function of the position inside the area covered, with a greatly enhanced possibility of destructive interference being set up between the responses from different tags, and without being able to apply the phasing of this invention. A typical case is where a response from one tag is cancelled out by the response from another tag in phase opposition, for example in a symmetrical position with respect to the axis of the rotating field.

Three-phase polling using three coils is also unsuitable for the same reason of lack of phase correspondence. Similarly, pairwise polling of three coils is unsuitable. In the invention, polling signals are sent out by the stations successively in different directions, preferably in orthogonal directions, and advantageously in three orthogonal directions. The successive evaluation in three directions makes it possible to detect all tags, ensuring they are brought into phase. Obviously, depending on the application, one or two directions may be sufficient. A (tri-axial) inductor comprising three windings the axes of which should be practically orthogonal can be provided as shown in FIG. 6 in exploded form, and comprising:

one winding setting up a field in the X-direction (turns X1, X2);

one winding setting up a field in the Y-direction (turns Y1, Y2);

one winding setting up a field in the Z-direction (turns Z1, Z2, Z3);

A full read sequence is performed by feeding each one of the windings, the other two being unpowered.

In the worst case, a tag can be parallel to the inductive field of two windings but will receive a non-zero flux from the third one. Depending on its position and its orientation, a tag will be recognised in 1, 2 or 3 sequences. At the end of the process it will thus be essential to compare the lists of tags recognised and eliminate possible repetitions.

The read loops, which are not shown on FIG. 6, are parallel to the turns of the inductor with which they are associated.

Other embodiments are obviously also possible.

What is claimed is:

1. A method for use by a station in remote polling of electronic tags that may interfere with each other, the method comprising:

(a) sending at least one polling signal from the station to the electronic tags, (b) receiving reply signals from the electronic tags in response to the polling signal, and (c) bringing the tags into phase alignment before the reply signals are transmitted.

2. The method according to claim 1, wherein the tags simultaneously send a common response.

3. The method according to claim 1, wherein the step in which the tags are brought into phase comprises sending of a phasing command by said station.

4. The method according to claim 3, wherein said phasing command comprises breaking off sending followed by sending of an alternating signal.

5. The method according to claim 3, wherein the step in which the tags are brought into phase is carried out, at a tag, by counting half waves of a phasing command and determining a polarity of a half wave of a predetermined rank.

6. The method according to claim 3, wherein the step in which the tags are brought into phase is carried out, at a tag, by counting half waves of a phasing command and sending a response to the station having the polarity of a determined half wave in said phasing command.

7. The method according to claim 1, wherein the response from tags is sent at a frequency which is a sub-multiple of a station send frequency.

8. The method according to claim 1, wherein polling signals are sent by said station successively in different directions.

9. The method according to claim 8, wherein polling signals are sent by said station successively in orthogonal directions.

10. The method according to claim 8, wherein polling signals are sent by said station successively in three orthogonal directions.

11. A station for remotely polling electronic tags comprising:

(a) means for sending polling signals to said electronic tags, (b) means for receiving responses from said tags, and (c) control means configured to effect a phasing command for bringing said tags into phase alignment before the responses are transmitted.

12. The station according to claim 11 wherein said command for bringing said tags into phase comprises a break in sending followed by the sending of an alternating signal.

13. The station according to claim 12 wherein the means for sending polling signals include means for rapidly bringing an alternating signal to a steady state.

14. The station according to claim 13 wherein the means for sending polling signals comprise:

a resonant circuit with an inductor and a tuning capacitor;
    means for exciting said resonant circuit with an excitation alternating voltage;
    and wherein the means for rapidly bringing an alternating signal to a steady state comprise:
    means for blocking said excitation alternating voltage at one half wave, and
    means for maintaining a permanent current in said inductor.

15. The station according to claim 14 wherein said means for maintaining a permanent current in said inductor comprise a resistor one end of which is connected to a point in said resonant circuit between said inductor and said tuning capacitor, and another end of which can be connected to ground.

16. The station according to claim 11, wherein the means for sending polling signals are capable of successively sending polling signals in different directions.

17. The station according to claim 11, wherein the means for sending polling signals are capable of successively sending polling signals in different orthogonal directions.

18. The station according to claim 11 wherein the means for receiving responses from said tags comprise a read coil and means for balancing out a voltage induced in said read coil by said sending means.

19. The station according to claim 18 wherein said means for balancing out a voltage induced in said read means by the transmission means comprise a transformer.

20. An electronic tag having means for communicating with a station for receiving polling signals from the station and sending responses to said station comprising means for counting half waves of a phasing command sent by the station, and means for determining a polarity of a determined half wave in said polling signal.

21. The electronic tag according to claim 20, wherein said means for communicating with a station comprise coil means and in which said counting means comprise two threshold amplifiers and a counter receiving output signals of said two threshold amplifiers as its input signal.

22. The electronic tag according to claim 20 wherein a current in said coil means is modified by short-circuiting said coil means.

23. An electronic tag having means for communicating with a station for receiving polling signals from the station and sending responses to said station comprising means for counting half waves of a phasing command, and wherein said means for communicating with a station send a response having a polarity equal to that of a determined half wave of said phasing command.

24. The electronic tag according to claim 23, wherein said means for communicating with a station comprise coil means and in which said counting means comprise two threshold amplifiers and a counter receiving output signals of said two threshold amplifiers as its input signal.

25. The electronic tag according to claim 23 wherein said means for communicating with a station comprise coil means and in which sending of responses is achieved by modifying a current in said coil means.

26. The electronic tag according to claim 23 wherein a current in said coil means is modified by short-circuiting said coil means.

27. A method for remote polling of electronic tags from a station in which, in reply to polling signals sent by said station, the tags send responses which may interfere, and comprising a step in which the tags are brought into phase before sending their responses, wherein the step in which the tags are brought into phase comprises sending of a phasing command by said station, and wherein said step is carried out, at a tag, by counting half waves of a phasing command and determining a polarity of a half wave of a predetermined rank.

28. A method for remote polling of electronic tags from a station in which, in reply to polling signals sent by said station, the tags send responses which may interfere, and comprising a step in which the tags are brought into phase before sending their responses, wherein the step in which the tags are brought into phase comprises sending of a phasing command by said station, and wherein said step is carried out, at a tag, by counting half waves of a phasing command and sending a response to the station having the polarity of a determined half wave in said phasing command.

29. A station for remotely polling electronic tags comprising:
(a) means for sending polling signals to the electronic tags,
(b) means for receiving responses from the tags, and
(c) control means, in which said polling signals include a command for bringing said tags into phase,
(d) wherein the command for bringing said tags into phase comprises a break in sending followed by the sending of an alternating signal,
(e) wherein the means for sending polling signals include:
(1) means for rapidly bringing an alternating signal to a steady state,
(2) a resonant circuit with an inductor and a tuning capacitor, and
(3) means for exciting said resonant circuit with an excitation alternating voltage, and
(f) wherein the means for rapidly bringing an alternating signal to a steady state comprise:
(1) means for blocking said excitation alternating voltage at one half wave, and
(2) means for maintaining a permanent current in said inductor.

30. The station according to claim 29 wherein said means for maintaining a permanent current in said inductor comprise a resistor, one end of which is connected to a point in said resonant circuit between said inductor and said tuning capacitor, and another end of which can be connected to ground.

* * * * *